Feb. 20, 1923. 1,446,416
W. C. CURTISS
PROTECTIVE COVER FOR FRUIT TREES
Filed Feb. 20, 1922
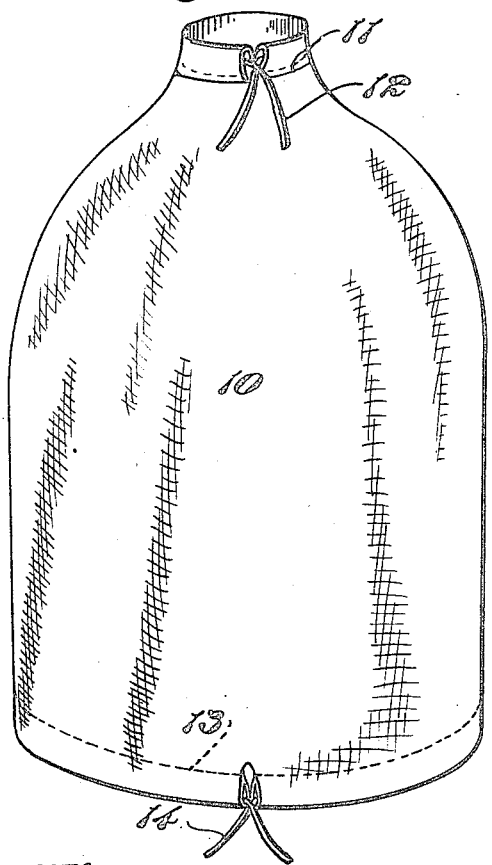
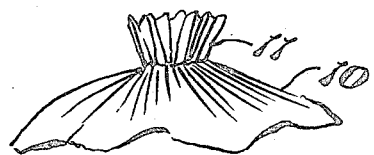
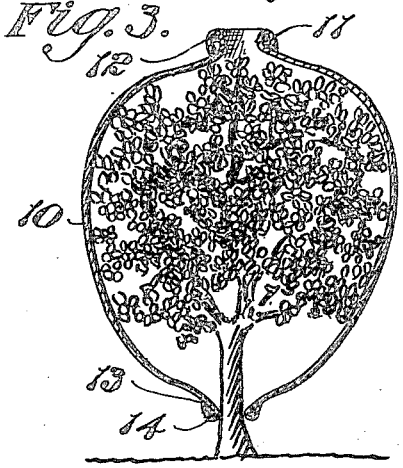
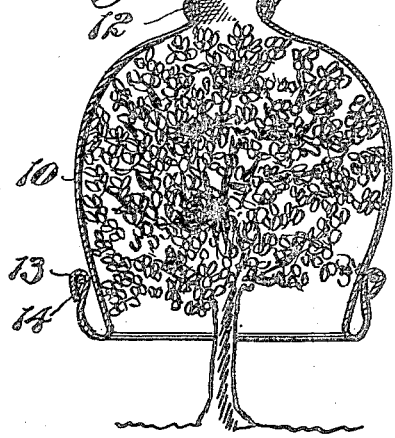

Patented Feb. 20, 1923.

1,446,416

UNITED STATES PATENT OFFICE.

WILLIAM C. CURTISS, OF LOS ANGELES, CALIFORNIA.

PROTECTIVE COVER FOR FRUIT TREES.

Application filed February 20, 1922. Serial No. 537,890.

*To all whom it may concern:*

Be it known that I, WILLIAM C. CURTISS, a citizen of the United States, residing at Los Angeles, in the county of Los Angeles and State of California, have invented new and useful Improvements in Protective Covers for Fruit Trees, of which the following is a specification.

My invention relates to a protective cover for fruit trees, the principal objects of my invention being to provide a relatively simple, practical and efficient covering or envelope of flexible material, such as fabric, which may be utilized for covering a fruit tree for the purpose of protecting the same and the fruit thereon against frost and freezing temperatures, and likewise for preventing the fruit on the tree from becoming burnt by the sun or from ripening too quickly.

A further object of my invention is to provide a protective cover for trees that, requiring no support other than the trees to be protected, may be easily and quickly applied for use and which may be adjusted in various ways to control the ventilation or passage of air currents through the covering.

With the foregoing and other objects in view, my invention consists in the features of construction and combination and arrangement of parts hereinafter more fully described and claimed, reference being had to the accompanying drawings, in which—

Figure 1 is a perspective view of a protective covering of my improved construction;

Figure 2 is an elevational view of a tree having my improved protective covering applied thereto and showing means for heating the space within said covering so as to protect the tree against freezing;

Figure 3 is an elevational view of a tree with my improved protective covering thereon, the lower portion of the latter being folded into position against the trunk of the tree;

Figure 4 is an elevational view of a tree with my improved protective covering applied thereto, the lower portion of said covering being folded upwardly to permit a free circulation of air through the covering;

Figure 5 is a detail perspective view of the upper end of the protective covering showing the same in closed position.

My improved protective covering is preferably formed of fabric, such as burlap or heavy muslin, and the body thereof is in the form of an elongated cylinder that decreases in diameter toward its upper end. Obviously, the diameter and length of this protective body may vary according to the size of the trees that are to be covered, but it is essential that the diameter of the lower portion of the covering be such that it may be readily passed over the body of the tree or that part thereof that includes the branches. The relatively small upper end of the body 10 is provided with a hem 11 through which passes a draw string 12, the ends of which extend a substantial distance beyond the openings into the hem, and the lower end of said body 10 is also provided with a hem 13 through which passes a draw string or cord 14. When the protective member thus constructed is applied to a tree for the purpose of protecting the same and the fruit thereon against freezing temperatures and frost, said protective member is arranged as illustrated in Figure 2, with the upper end of said member drawn together to form a relatively small opening at the top of said member and the lower end of the member open to its fullest extent and lying directly on the ground.

If desired, a suitable heating device, such as a small lamp or oil burner, may be located on the ground adjacent to the tree trunk and within the protective member, and this lamp, while burning, will be effective in producing a certain amount of warm air, which passes upwardly through the branches of the protected tree.

In some instances, it may be found desirable and advantageous to draw the lower portion of the protective member 10 together below the lower branches of the tree and directly around the tree trunk, as illustrated in Figure 3, and this may be accomplished by proper manipulation of the drawing string or cable 13. Further, in some instances, it may be found desirable to entirely close the opening at the upper end of the member, as illustrated in Figure 5, and this may be done by proper manipulation of the draw string or cord 12.

Where it is desired to protect the tree and the fruit thereon from sunburn, the protective covering is arranged as illustrated in Figure 4, with the lower portion of the body 10 turned or folded upwardly and secured by means of the cord 13, and with the opening at the upper end of the member in full open position so that air may circulate freely through the space enclosed by the protective member and through the branches of the trees on which said member is positioned. It is at times desirable to prevent certain fruits, such as apricots and peaches, from ripening too quickly, and by using the protective covering on the tree as illustrated in Figure 4 the fruit on the tree is protected against the direct rays of the sun and at the same time the fruit has ample ventilation.

The use of my improved protective covering for fruit trees during periods when there is danger of frost and of freezing eliminates the time, labor and expense involved in the operation of smudge pots, which latter it will be understood require attention from time to time, and in addition the use of smudge pots is objectionable due to the large amount of smoke and soot that is produced during their operation.

A protective covering for trees of my improved construction is comparatively simple, may be easily and cheaply produced, and is very effective in performing its intended functions.

It will be understood that minor changes in the size, form and construction of the various parts of my improved protective covering for trees may be made and substituted for those herein shown and described without departing from the spirit of my invention, the scope of which is set forth in the appended claims.

I claim as my invention:

1. A protective covering for trees adapted to be supported exclusively thereby and comprising a substantially hollow conical member having openings at both ends, and means connected to the ends of said body for closing the same to a desired degree.

2. A protective covering for trees adapted to be supported exclusively thereby and comprising a substantially conical body formed of fabric open at both ends, and flexible members connected to said open ends and adapted to close the same to a desired degree.

3. A protective covering for trees adapted to be supported exclusively thereby and comprising a substantially conical body formed of fabric, open at both ends, there being hems formed on the edges of the open ends of said body, and flexible members passing through said hems.

4. A protective covering for trees adapted to be supported exclusively thereby and comprising a substantially cylindrical body formed of flexible material, the upper portion of which is smaller in diameter than the lower portion, the ends of said member being open, and draw strings associated with the body of said member for closing said open ends.

In testimony whereof I have signed my name to this specification.

WM. C. CURTISS,